Figure 1:
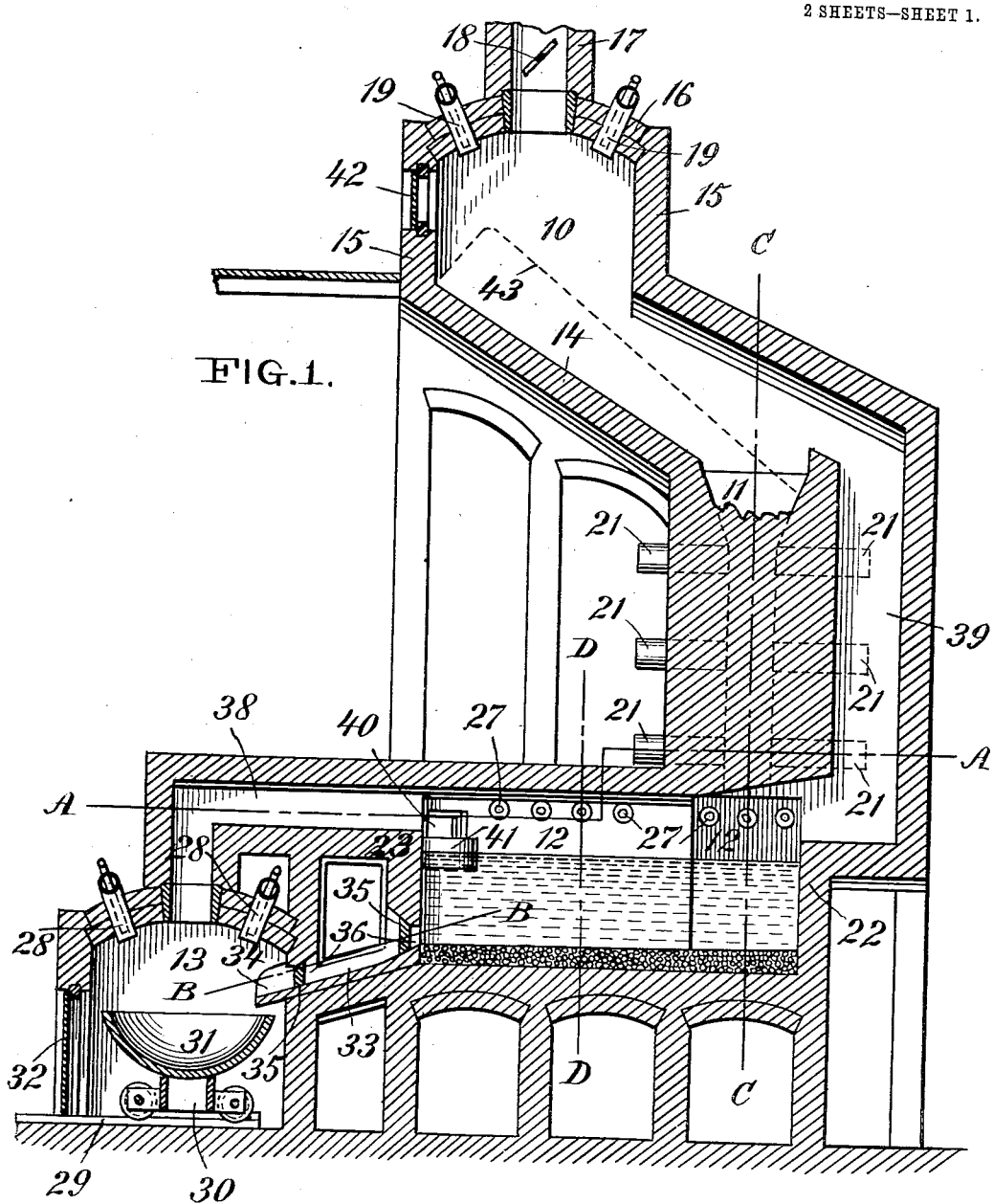

No. 762,270. PATENTED JUNE 14, 1904.
G. H. BENJAMIN.
GLASS MELTING FURNACE.
APPLICATION FILED JAN. 3, 1903.

NO MODEL. 2 SHEETS—SHEET 1.

WITNESSES: INVENTOR

No. 762,270. PATENTED JUNE 14, 1904.
G. H. BENJAMIN.
GLASS MELTING FURNACE.
APPLICATION FILED JAN. 3, 1903.
NO MODEL. 2 SHEETS—SHEET 2.
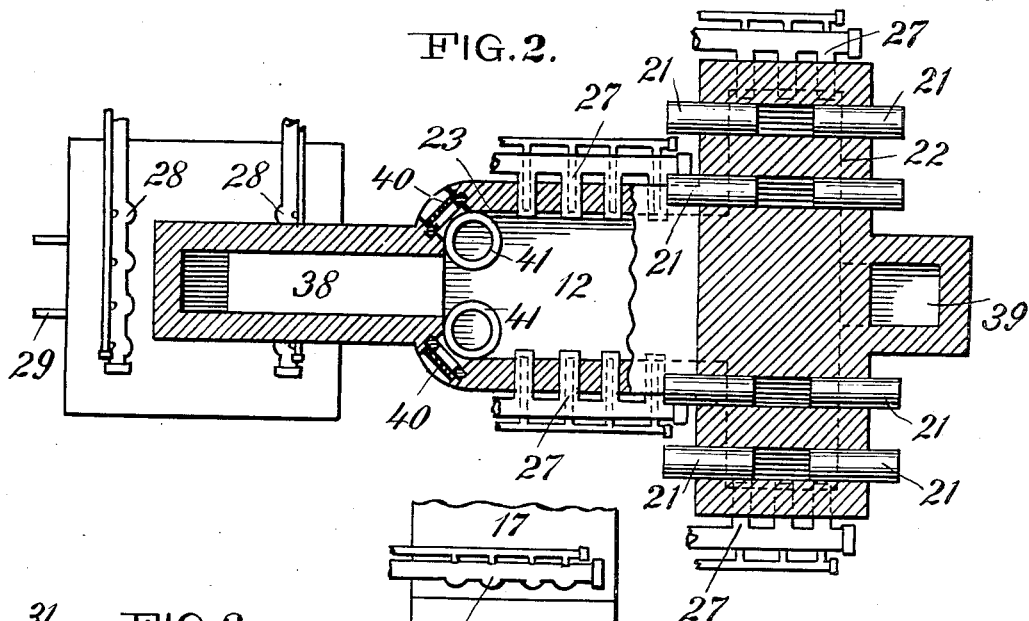
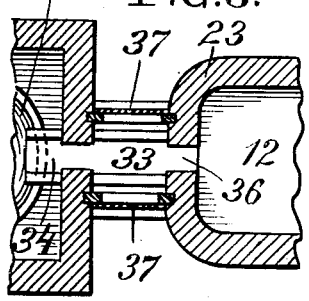
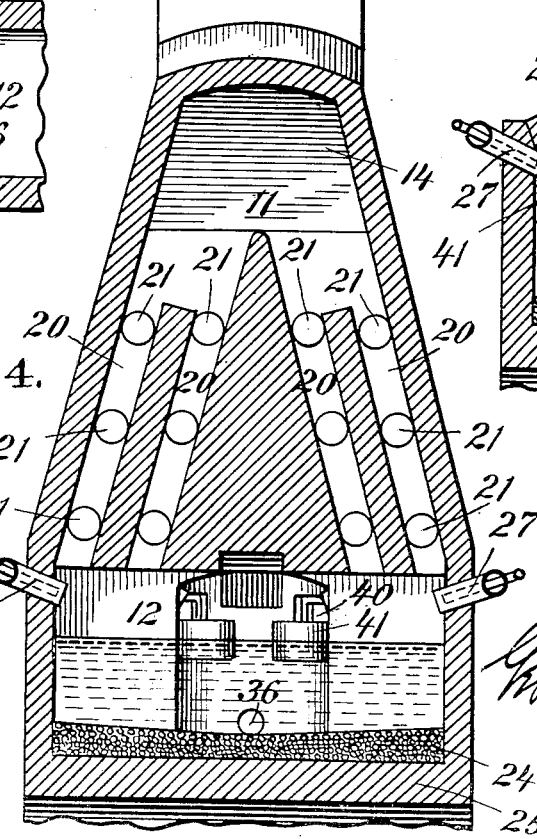
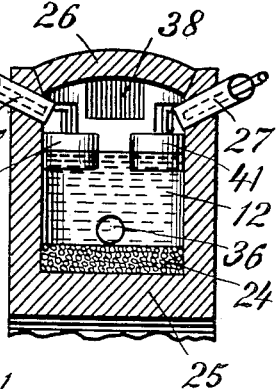
WITNESSES: INVENTOR No. 762,270.

Patented June 14, 1904.

UNITED STATES PATENT OFFICE.

GEORGE H. BENJAMIN, OF NEW YORK, N. Y.

GLASS-MELTING FURNACE.

SPECIFICATION forming part of Letters Patent No. 762,270, dated June 14, 1904.

Application filed January 3, 1903. Serial No. 137,688. (No model.)

*To all whom it may concern:*

Be it known that I, GEORGE H. BENJAMIN, a citizen of the United States, residing at New York city, county and State of New York, have invented certain new and useful Improvements in Glass-Melting Furnaces, of which the following is a specification.

This invention relates to the manufacture of glass in what is now commonly known as a "tank-furnace."

The invention consists in the construction of the furnace and the mechanism employed for drawing the melted glass from the furnace and for conveying it to a distance.

The object of my invention is to improve the manufacture of glass and to decrease the time required to effect combination of the glass-making materials, which is accomplished by subjecting the glass-making materials to a gradually-increasing temperature until a certain point in the furnace is reached, then to the action of a very high temperature, and finally to the action of a lower refining temperature in a tank of the required depth.

A further object of my invention is to provide means for drawing the melted and refined glass from the melting structure into a removable vessel contained within a chamber, where it may be kept at the required temperature until wanted.

The accompanying drawings will serve to illustrate my invention.

Figure 1 is a vertical section through the furnace structure and removable vessel. Fig. 2 is a section on the line A A of Fig. 1. Fig. 3 is a section on the line B B of Fig. 1. Fig. 4 is a section on the line C C of Fig. 1. Fig. 5 is a section on the line D D of Fig. 1.

In the drawings similar numerals indicate like parts.

In the drawings the melting portion of the furnace consists of three chambers, which for the purposes of description I will denominate as 10, the preliminary-fusion or fusion chamber; 11, the electric chamber; 12, the refining-chamber. Another chamber, 13, I term the "heating-chamber" and which is properly not a part of the melting-furnace, but is included within the same structure, and hence may be considered as an adjunct. The fusion-chamber 10 is provided with an inclined hearth 14, vertical side walls 15, and a high crown 16. Extending upward from the crown 16 and at the highest point in furnace structure is the chimney-flue 17, in which is located a damper 18. The crown 16 I prefer to locate at such a distance above the hearth 14 as to permit free radiation of flame within the fusion-chamber without touching the material upon the hearth 14, which flame may be introduced through the hydrocarbon-burners 19, projecting through the roof of the chamber. The electric chamber 11 has its top connected to the bottom of the fusion-chamber 10, is wider at the bottom than at the top, and is divided into four vertically-inclined diverging passages 20. Arranged equidistant and opposite in these passages are the electrodes 21, which may be formed of carbon or other suitable material and connected to a source of electrical energy. Three sets of electrodes are shown in each passage. The number of electrodes may be increased or diminished, as desired. I do not limit myself to the exact disposition for the electrodes shown, as other arrangements may be employed. The refining-chamber 12 is shown as having its rear portion 22 located immediately under the electric chamber and wider than its front portion 23. This chamber 12 is preferably of considerable vertical depth. In practice I find it best to give it a depth of between thirty-two and forty-eight inches, depending upon the character of glass it is desired to make. One reason for making the refining-chamber of considerable vertical depth is to allow the formation of a layer of chilled glass 24 over the bottom 25 of the chamber, which serves to prevent injury to the bottom blocks and the working of the bottom blocks up into the melted glass. The chamber 12 is also provided with a crown 26 of sufficient vertical height to permit free radiation of flame within the refining-chamber, which may be introduced by the hydrocarbon-burners 27, which project into both sides of the front and rear portions 23 22 of this chamber.

The heating-chamber 13 is located in front of the refining-chamber and is provided with a crown, in which are situated the hydrocarbon-burners 28. Arranged over the hearth of this chamber are tracks 29, on which is located a carriage 30, carrying a receiving vessel 31. The front of the chamber 13 has formed in it a door 32, through which the carriage and vessel 31 may be moved out of the chamber 13.

Introduced between the bottom of the refining-chamber 12 and the heating-chamber 13 is a trough 33, provided with a spout 34, located above the receptacle 31. This passage 33 serves to convey the melted glass from the refining-chamber 12 into the receptacle 31 when desired.

35 represents clay plugs, which may be introduced into the opening 36 in the front of the tank 12 and in the front of the passage 33 to prevent the flow of glass along the passage 33 when desired. Access to the passage 33 from the exterior of the furnace may be obtained through the doors 37, Fig. 3.

38 represents a flue leading from the top of the heating-chamber and discharging into the refining-chamber 12, and 39 a flue leading from the back of the refining-chamber 12, passing around the electric chamber 11, and discharging into the fusion-chamber 10.

40 indicates gathering-doors in the front portion 23 of the refining-tank 12, through which glass may be gathered by hand from the interior of this chamber; 41, gathering-rings in front of the gathering-doors 40; 42, door in the side of the fusion-chamber 10, through which the glass batch may be introduced into the fusion-chamber. The dotted line 43 in this chamber indicates the general position or level of the glass batch in the fusion-chamber and over the top of the electric chamber.

The operation of my improved furnace structure is as follows: The glass-making materials are charged through the door 42 into the chamber 10. Here they are subjected to the heat derived from the burners in the fusion and refining chambers 10 12, the electric arcs in the electric chamber 11, and also, when in operation, from the burners in the heating-chamber 13. The temperature of the heat, it will be observed, by reason of the construction of the furnace is a gradually-increasing temperature from the point at which the material is charged into the fusion-chamber until the electric chamber is reached. The action of this heat is, first, to evaporate all of the moisture, as well as the water of crystallization, contained in the glass batch, and, secondly, to effect a partial melting or agglomeration of the glass-making materials, which reach the electric furnace in a fluid or semifluid state, depending upon the temperature of the furnace. The glass-making materials in melting in the fusion-chamber flow down and into the passages 20 and in passing through such passages are brought within the influence of the temperature created by the electric arcs between the electrodes, with the effect that practically perfect combination of the glass-making materials results. After passing the arcs the melted glass flows into the refining-chamber 12, where it is subjected to a lower temperature, which effects a vertical and progressive movement of the glass particles from the rear end 22 of the chamber 12 toward the front or gathering end 23 of the chamber. When the melted material reaches the front end of the chamber, it is in a condition to be gathered by hand through the gathering-doors 40 or to be drawn through the passage 33 into the receptacle 31. The material which is discharged into the receptacle 31 may be maintained at the required temperature in the heating-chamber 13 until it is desired for use, when the receptacle is withdrawn from the chamber 13 and a fresh receptacle introduced in its place.

It will be observed by those familiar with the art of manufacturing glass in tank-furnaces that the length of the refining-tank is much less than is required to produce the proper refining of glass in tanks where the batch is charged in on the glass-making materials at one end of the tank, as is usual, and that this reduction in length is due to the fact that the glass-making materials are thoroughly melted in the fusion and electric chambers before reaching the refining-chamber.

One great advantage obtained by the construction described is found in the fact that the primary heating of the glass-making materials in the fusion-chamber effects separation of the moisture or water of crystallization accompanying the glass-making materials before the partially-combined glass-making materials reach the zone of highest temperature, which water, commonly known as the "salt-water," in ordinary tank constructions overlies the glass-making materials in the tank and materially interferes with the absorption of heat by the melted glass. In my improved structure the materials reach the highest zone of temperature absolutely free from moisture and in a condition when subjected to the intense temperature of the electric chamber to perfectly combine to form homogeneous glass, which when discharged from said electric chamber into the refining-chamber is in a condition to absorb the heat generated in such chamber to effect the required "planing" of the glass.

I wish it understood that I do not limit myself to the exact construction of the various chambers shown and described. I prefer, however, that the construction shall be such that the material as it melts in the first chamber shall flow by gravity into the electric chamber and through the electric chamber in passages which will radiate heat into the refining-chamber and, further, that the heat and products of combustion of the refining-chamber, as well as those of the heating-chamber, be passed around the electric chamber through a suitable flue and not through the electric chamber. The advantage of using a flue around the electric chamber is found in the fact that the products of combustion from the heating and refining chamber occasionally contain free carbon, which if brought into intimate contact with the melted glass while in the electric chamber is apt to combine with the glass-making materials and color the glass. By carrying the flue around the chamber the products of combustion do not come in contact with the falling mass of glass while in the zone of highest temperature, but follow the flue and pass along the sides and top of the fusion-chamber above the glass-making materials upon the hearth of the fusion-chamber and thence to the exit-flue. Further, I do not wish to limit myself to the employment of hydrocarbon-burners for heating the fusion, refining, and heating chambers, as I may use natural-gas burners or producer-gas with regenerators, as is common with such furnace.

I have not described or shown any method of adjusting the electrodes. Manifestly any means may be used for this purpose which may be found suitable.

Having thus described my invention, I claim—

1. A glass-melting furnace comprising in its construction, a preliminary fusion-chamber, means for maintaining a fusion temperature in said chamber, an electric chamber connected to said fusion-chamber, means for heating said chamber to the temperature of an electric arc, a refining-chamber located under the electric chamber, and means for heating said chamber.

2. A glass-melting furnace comprising in its construction, a preliminary fusion-chamber having an inclined hearth and a charging-door, means for maintaining a fusion temperature in said chamber, an electric chamber connected to and located below said fusion-chamber, means for heating said chamber to the temperature of an electric arc, a refining-chamber located under the electric chamber and having a horizontal hearth, and means for heating said chamber.

3. A glass-melting furnace comprising in its construction, a preliminary fusion-chamber having an inclined hearth, means for maintaining a fusion temperature in said chamber, an electric chamber connected thereto having a vertical passage through which the glass materials flow, electrodes between which electric arcs may be formed located in said passage, and a refining-chamber located under said electric chamber and provided with heating means.

4. A glass-melting furnace comprising in its construction, a preliminary fusion-chamber having an inclined hearth, and a high crown, means for maintaining a fusion temperature in said chamber, an electric heating-chamber situated under and connected to said fusion-chamber and having a series of passages through which the glass-making materials flow, a series of oppositely-disposed electrodes in each of said passages, a refining-chamber located under the electric chamber, and means for heating the refining-chamber.

5. A glass-melting furnace comprising in its construction, a preliminary fusion-chamber, means for maintaining a fusion temperature in said chamber, an electric chamber located under and connected to said fusion-chamber and provided with means for heating said chamber to the temperature of an electric arc, a refining-chamber located under the electric chamber, means for heating said chamber, and a flue leading from the refining-chamber into the fusion-chamber around the electric chamber.

6. A glass-melting furnace comprising in its construction, a preliminary fusion-chamber, means for maintaining a fusion temperature in said chamber, an electric chamber located under and connected to said fusion-chamber and provided with means for heating said chamber to the temperature of an electric arc, a refining-chamber located under the electric chamber, means for heating said chamber, a flue leading from the refining-chamber into the fusion-chamber around the electric chamber, and an exit-flue from the fusion-chamber.

7. A glass-melting furnace comprising in its construction, a preliminary fusion-chamber, means for maintaining a fusion temperature in said chamber, an electric chamber connected to the bottom of said chamber, means for heating said chamber to the temperature of an electric arc, a refining-chamber located under and connected to the electric chamber, said chamber provided with gathering-doors and a discharge-spout from the bottom of said chamber, and means for heating said chamber.

8. A glass-melting furnace comprising in its construction, a preliminary fusion-chamber, means for maintaining a fusion temperature in said chamber, an electric chamber connected to said fusion-chamber, means for heating said chamber to the temperature of an electric arc, a refining-chamber connected to said electric chamber, means for heating said chamber, a heating-chamber, means for discharging the contents of the refining-chamber into the heating-chamber, and means for heating the heating-chamber.

9. A glass-melting furnace comprising in its construction, a preliminary fusion-chamber, means for maintaining a fusion temperature in said chamber, an electric chamber connected to the fusion-chamber, means for heating said chamber to the temperature of an electric arc, a refining-chamber located under the electric chamber, means for heating said chamber, a heating-chamber within the said structure but separated from the refining-chamber, a flue leading from the top of the heating-chamber and discharging into the refining-chamber, and a passage through which the material in the refining-chamber may be discharged into the heating-chamber.

10. A glass-melting furnace comprising in its construction, a preliminary fusion-chamber, means for maintaining a fusion temperature in said chamber, an electric chamber connected to the fusion-chamber, means for heating the electric chamber to the temperature of an electric arc, a refining-chamber located under the electric chamber, means for heating the refining-chamber, a heating-chamber comprised within the same structure but separated from the refining-chamber, a flue leading from the heating-chamber into the refining-chamber, a removable vessel in the refining-chamber, means for discharging the contents of the refining-chamber into said vessel, and means for heating the heating-chamber.

11. A glass-melting furnace comprising in its construction, a preliminary fusion-chamber, provided with an inclined hearth and a high crown, an electric chamber connected to said fusion-chamber provided with a series of inclined passages, means for creating a series of electric arcs in said passages, a refining-chamber connected to and located below the passages in the electric chamber, said chamber wider at its rear portion than at its front and provided with gathering-doors at its front portion, a heating-chamber located in front of the front portion of said refining-chamber, and passages connecting said two last-named chambers, through which the products of combustion may be carried from the heating-chamber to the refining-chamber and the melted material from the refining-chamber to the heating-chamber.

12. A glass-melting furnace comprising in its construction, a preliminary fusion-chamber, means for introducing gaseous fuel into the top of the chamber, an electric chamber located under and connected to said chamber, means for creating a temperature in such chamber approximately that of an electric arc, a refining-chamber located under said electric chamber and connected thereto, and means for introducing gaseous fuel along the sides and upper portion of said chamber.

13. A glass-melting furnace comprising in its construction, a preliminary fusion-chamber, means for maintaining a fusion temperature in said chamber, an electric chamber, means for heating said chamber to the desired temperature, a refining-chamber, means for heating said chamber, a heating-chamber, means for heating said chamber, and means for conveying the products of combustion and heat set free in said electric and refining chambers to and through the fusion-chamber.

14. A glass-melting furnace comprising in its construction, a preliminary fusion-chamber, an electric chamber, a refining-chamber, a heating-chamber embodied within the same structure and situated at progressively lower levels and provided with heating means of the character described, and an exit-flue for the products of combustion and evolved gases from said chambers, located at the highest point in the furnace structure.

15. A glass-melting furnace comprising a preliminary fusion-chamber, an electric chamber, and a refining-chamber connected together and situated at progressively lower levels and means for heating said chambers to the required temperatures as described.

16. A glass-melting furnace comprising a preliminary fusion-chamber, an electric chamber, a refining-chamber, and a heating-chamber located at progressively lower levels, means for establishing communication between the bottom of the refining-chamber and the heating-chamber, and means for heating said chambers to the required temperatures, as described.

17. A glass-melting furnace comprising in its construction, a tank-like refining-chamber, means for heating said chamber, a heating-chamber comprised within the same structure but separated from the refining-chamber, a flue leading from the heating-chamber to the refining-chamber, a removable vessel located in the heating-chamber, means for discharging the contents of the refining-chamber into the vessel in the heating-chamber, and means for heating the heating-chamber.

18. A glass-melting furnace provided with means for subjecting the glass-making materials to the required temperatures to first separate the moisture and evaporate the water of crystallization, then effect partial melting and combination, then complete combination, and finally the refining of the materials.

19. In a glass-melting furnace, the combination of a preliminary fusion-chamber, a tank-like refining-chamber, an electric chamber interposed between the two, and means for heating said chambers to the required temperatures.

20. A glass melting and fining furnace embodying in its construction, means for drying, means for heating and partially melting, and means for subsequently subjecting the glass-making materials to the physical effects of an electric arc.

21. A glass-melting furnace embodying in its construction, means for drying and partially fusing the glass-making materials, means whereby the glass-making materials are subjected to the high-temperature effect of an electric arc, and means whereby the glass-making materials are subjected to vertical fining or planing at a temperture lower than the melting temperature of such materials.

22. A glass-melting furnace embodying in its construction, means for drying and partially melting the glass-making materials, means for subjecting such materials to the heat of an electric arc, and means for fining or planing said materials while subjected to a temperature less than the melting temperature of said materials.

In testimony whereof I affix my signature in the presence of two witnesses.

GEORGE H. BENJAMIN.

Witnesses:
   J. E. PEARSON,
   FRANK O'CONNOR.